Dec. 2, 1958 C. J. THELANDER 2,862,376
FRICTION DRIVE FOR LAWN MOWER BLADE
Filed July 11, 1955

Inventor
Clement J. Thelander
By McCanna and Morsbach
Attys.

United States Patent Office 2,862,376
Patented Dec. 2, 1958

2,862,376

FRICTION DRIVE FOR LAWN MOWER BLADE

Clement J. Thelander, Sterling, Ill., assignor to Buffalo Eclipse Corporation, North Tonawanda, N. Y., a corporation of New York Application July 11, 1955, Serial No. 520,978

6 Claims. (Cl. 64—30)

This invention relates to an apparatus for connecting a rotary driven element to a drive shaft and particularly to an apparatus for use in rotary lawn mowers and the like for yieldably connecting the cutter blade to the drive shaft.

An important object of this invention is to provide an improved friction driven apparatus for yieldably connecting a rotary driven element to a drive shaft, which drive apparatus is arranged to apply a constant predetermined pressure to effect a frictional drive with the driven element and which will not tighten or become loose during use.

Another object of this invention is to provide a friction drive apparatus attachable to a drive shaft for providing a yieldable connection between a driven element and the drive shaft in which common means is utilized to both attach the apparatus to the drive shaft and to apply a preselected pressure to the clutch mechanism for frictionally connecting the driven element to the apparatus.

A further object of this invention is the provision of an apparatus for yieldably connecting a driven element to a drive shaft which enables the use of a driven element having a relatively small mounting opening therein so as to not weaken the driven element.

Still another object of this invention is the provision of an apparatus for yieldably attaching a driven element to a drive shaft which is of simple construction, easy to fabricate and assemble, and which is durable and efficient for its intended purpose.

These, together with various ancillary objects and advantages of this invention will be more readily appreciated as the same becomes better understood by reference to the following detailed description when taken in connection with the accompanying drawings wherein.

Figure 1:
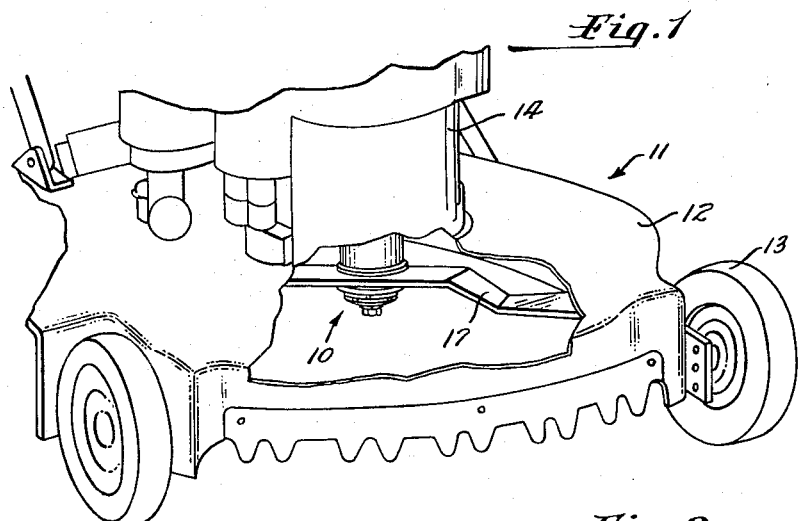
Figure 1 is a fragmentary perspective view of a rotary lawn mower having the drive apparatus of the present invention mounted thereon.

Reference is now made more specifically to the accompanying drawings wherein the drive apparatus indicated generally by the numeral 10 is shown applied to a rotary lawn mower 11. The lawn mower may be of any conventional construction and in general includes a housing 12 supported on wheels 13. A motor 14 is mounted on the housing and has an output shaft 15 extending downwardly through the housing.

Figure 2:
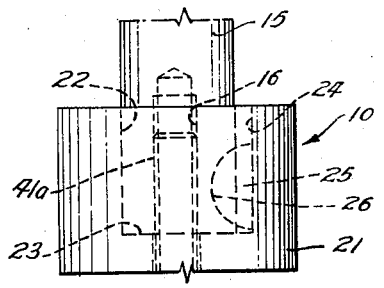
Fig. 2 is an enlarged side elevational view of the drive apparatus, with parts broken away and shown in section to illustrate details of construction.
Figure 3:
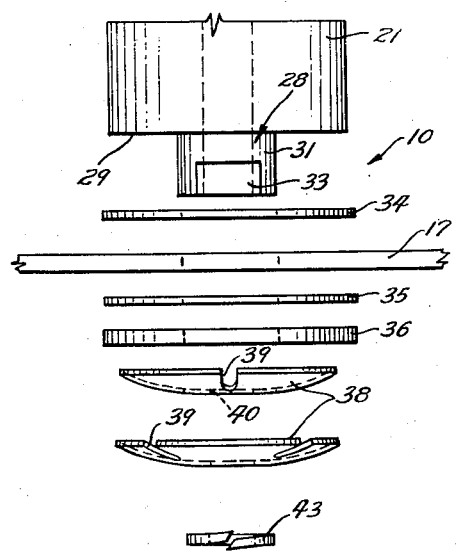
Fig. 3 is an enlarged fragmentary exploded assembly view of the drive apparatus.
Figure 4:
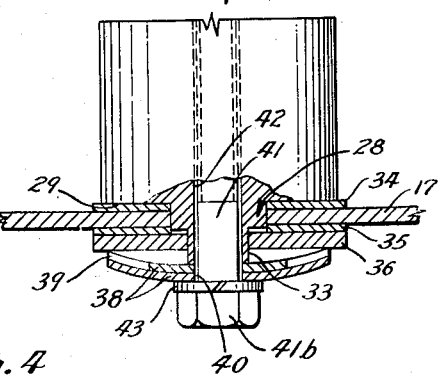
Fig. 4 is an enlarged perspective view of the drive washer.
Figure 4:
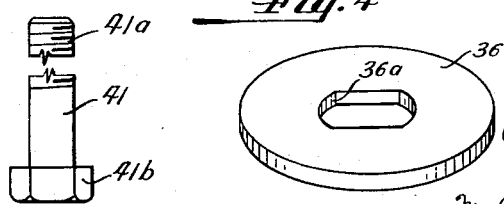

The drive apparatus 10 is specifically adapted for attachment to a drive shaft 15 having an internally threaded bore 16 extending into the end thereof and is arranged to yieldably connect a driven element such as the cutter blade 17 to the drive shaft so that when the driven element hits an obstruction, the drive connection between the driven element and the drive shaft will yield and permit relative rotation therebetween. In this manner, damage to the motor and driven element is minimized. The drive apparatus includes a hub 21 of a diameter larger than the diameter of the shaft and having an axial shaft receiving bore 22 extending into one end thereof and defining a shoulder 23 at the inner end of the bore. Provision is made for non-rotatably connecting the hub to the drive shaft 15 and for this purpose there is provided a keyed connection between the hub and the shaft 15 which, as shown in Fig. 2, includes a keyway 24 formed in the hub and adapted to receive the key 25 disposed in a slot 26 in the drive shaft. Obviously, any other suitable means may be provided for slidably and non-rotatably connecting the hub to the drive shaft.

A reduced diameter shank 28 is formed on the other end of the hub and defines a downwardly facing annular shoulder 29 at the juncture of the shank of the hub. The shank 28 is preferably formed with a cylindrical portion 31 adapted to rotatably receive the driven element such as the blade 17 and a non-circular drive portion 33 on the end remote from the hub. The length of the hub 21 is made such that when the blade 17 is mounted thereon, the latter will be disposed at the proper level within the housing 12, and as is apparent the length of the hub will vary dependent upon the length of the drive shaft 15 to which it is attached.

In order to yieldably drive the cutter blade 17 there are provided a pair of clutch disks 34 and 35 on opposite sides of the cutter blade which clutch disks have central openings formed therein. The clutch disks are preferably rotatably disposed on the portion 31 of the shank 28. The length of the portion 31 is made slightly less than the overall thickness of the cutter blade and clutch disks and a drive washer 36, having a non-circular opening 36a formed complementary to the drive portion 33 of the shank, is slidably and non-rotatably disposed on the drive portion and engages one of the clutch disks 35.

A member is provided for applying pressure to the drive washer 36 to frictionally drive the cutter blade and, as shown in the drawings, the member comprises one or more dome-shaped washers 38. These washers may conveniently be formed with a plurality of notches 39 in the peripheries thereof to increase the resiliency of the washers and the latter are shaped to have the periphery thereof engage the drive washer 36 with the central portion overlying the end of the shank 33. The length of the shank 28 is made such that when the resilient washers 38 are pressed against the end thereof, the washers apply a predetermined pressure to the drive washer 36 to frictionally drive the blade with the hub.

The drive apparatus is arranged so that a single cap screw designated 41 is utilized to both secure the drive apparatus to the drive shaft 15 and to also apply pressure to the resilient washers 38 to compress the latter against the drive washer. As shown, the hub 21 is provided with a bore 42 which extends therethrough and through the shank portion 28 for the reception of the cap screw 41. The cap screw is threaded at one end 41a thereof and is arranged to threadedly extend into the tapped bore 16 in the drive shaft, a head 41b being provided at the other end of the cap screw for engagement with the resilient washers 38. The washers 38 have a central aperture 40 of a diameter to snugly receive the cap screw which extends therethrough and a lock washer 43 is interposed between the head 41b and the resilient washers 38. In the friction drive apparatus, the cap screw 41 is arranged to be threaded into the tapped bore 16 in the drive shaft until the shoulder 23 in the hub 21 firmly abuts against the end of the drive shaft and the resilient washers 38 are pressed against the end of the shank 28 on the hub. Commonly, the direction of the threads in the tapped bore 16 of the drive shaft is correlated to the direction of rotation of the shaft to tend to cause the cap screw to tighten as the shaft rotates. However, since the cap screw, when the drive apparatus is assembled on the shaft, is tightened to draw the pressure applying washers solidly against the end of the shank 28, further tightening of the cap screw during use is prevented. Moreover, under these conditions, the lock washer 43 is effective to prevent loosening of the cap screw, as may occur when the engine backfires and reverses the direction of rotation of the shaft. Thus, the set screw will not tend to become loosened or tightened during use and the resilient washers 38 will consequently apply a constant preselected pressure on the drive washer 36 to frictionally drive the blade.

The disclosed arrangement also enables the use of a single cap screw to attach the drive apparatus to the drive shaft and to also compress the resilient washers, thereby producing a simple construction which may be readily assembled and disassembled from the drive shaft. Additionally, since the shank 28 extends from one end of the hub, the size of the shank is independent of that of the drive shaft and may be made relatively smaller than the drive shaft. Consequently, only a small mounting opening need be formed in the driven element so as to not materially weaken the driven element or require additional reinforcement of the latter in the area adjacent its mounting.

I claim:

1. In a friction drive apparatus, the combination of a drive element having a reduced diameter shank on one end thereof for rotatably receiving a driven element, clutch means for rotatably connecting a driven element on said shank to said drive element, said clutch means including a drive washer slidably and non-rotatably mounted on said shank, a pressure applying member overlying the end of said shank and adapted when drawn against said end of the shank to apply a predetermined pressure on said drive washer, and a cap screw extending through said member and axially into said shank, said cap screw having a head thereon engageable with said member to draw the latter against the end of the shank whereby to apply a predetermined pressure to said drive washer and to lock said cap screw.

2. In an apparatus for connecting a rotary drive element to a drive shaft, the combination of a hub adapted for attachment to a drive shaft, said hub having a shank extending axially from one end thereof for rotatably receiving a driven element, clutch means for frictionally connecting a driven element on said shank to said hub, said clutch means including a drive washer slidably and non-rotatably mounted on said shank, a pressure applying member in the form of a domed resilient washer engageable with said drive washer and overlying the end of said shank adapted when drawn against the end of said shank to apply a predetermined pressure on said drive washer, and a cap screw extending through said member and axially into said hub and having a head thereon engageable with said member to draw the latter against the end of said shank.

3. In an apparatus for connecting a rotary driven element to one end of a drive shaft, the combination of a hub having a drive shaft receiving bore extending into one end thereof, a reduced diameter shank extending axially from the other end of said hub for rotatably receiving a driven element, clutch means for frictionally connecting a driven element on said shank to said hub, said clutch means including a drive washer slidably and non-rotatably mounted on said shank, a pressure applying member engageable with said drive washer and overlying the end of said shank adapted when drawn against the end of said shank to apply a preselected pressure to said drive washer, said hub having a reduced diameter bore extending therethrough and through said shank, and a cap screw extending through said member and through said reduced diameter bore and having threads on one end thereof for engaging a drive shaft disposed in said shaft receiving bore, said cap screw having a head on the other end thereof engageable with said pressure member to draw the latter snugly against the end of the shank and to draw the hub against the end of a drive shaft when the cap screw is tightened.

4. In an apparatus for connecting a rotary driven element to a drive shaft having a tapped hole in one end thereof, the combination of a hub having a shaft receiving bore extending into one end thereof and defining a shoulder at the inner end of said bore, key means for non-rotatably connecting said hub to said shaft, a reduced diameter shank extending axially from the other end of said hub for rotatably receiving a driven element, a clutch assembly for drivingly connecting said driven member to said hub, said clutch assembly including a drive washer, means for slidably and non-rotatably mounting said drive washer on said shank, a pressure applying member engageable with said drive washer and overlying the end of said shank, said member being adapted upon being drawn against the end of said shank to apply a predetermined pressure to said drive member, said hub having a bore smaller than said shaft bore extending axially therethrough and through said shank, and a cap screw extending through said pressure applying member and through said bore in the hub, said screw having threads on one end thereof engageable with the tapped hole in the drive shaft and a head on the other end thereof engageable with the pressure member adapted when tightened to draw the hub onto the drive shaft until the shoulder on said hub engages the end of the shaft and to draw the pressure member against the end of the shank.

5. In an apparatus for connecting a rotary driven element to a drive shaft having a tapped hole in the end thereof, the combination of a hub having a shaft receiving bore extending into one end thereof and defining a shoulder at the inner end of the bore, key means for non-rotatably connecting said hub to said shaft, a reduced diameter shank extending axially from the other end of said hub and defining a downwardly facing shoulder thereat, said shank having a first portion thereon adjacent said downwardly facing shoulder adapted to rotatably receive a driven element, a pair of clutch disks rotatably mounted on said first portion of the shank adapted for engagement with opposite sides of the driven element, said shank having a second portion thereon, a drive washer slidably and non-rotatably mounted on said second portion of the shank in engagement with one of said clutch disks on said first portion, a pressure applying member engageable with said drive washer and overlying the end of said shank adapted when drawn against the end of the shank to apply a predetermined pressure to said drive washer for effecting a friction drive with the driven element, said hub having a reduced diameter bore extending therethrough, a cap screw extending through the pressure applying member and through the reduced diameter bore in the hub, said screw having threads on one end thereof receivable in the tapped bore in the drive shaft and a head on the other end thereof engageable with the pressure applying member and adapted when tightened to draw the hub onto the drive shaft until the shoulder at the inner end of the shaft receiving bore abuts the end of the drive shaft and to draw the pressure member against the end of the shank to apply a predetermined pressure on the drive washer, and a lock washer interposed between the head of the cap screw and the pressure applying member.

6. The combination of claim 4 wherein said pressure applying member comprises a dome-shaped resilient washer adapted to have the periphery thereof engage the drive washer and to have the central portion thereof overlie the end of the shank.

References Cited in the file of this patent
UNITED STATES PATENTS

| | | |
|---|---|---|
| 2,535,415 | Heller | Dec. 26, 1950 |
| 2,539,619 | Goodall | Jan. 30, 1951 |
| 2,651,530 | Blydenburgh | Sept. 8, 1953 |
| 2,726,524 | Gorin | Dec. 13, 1955 |
| 2,737,792 | Dyer | Mar. 13, 1956 |